United States Patent [19]

Fleck et al.

[11] Patent Number: 5,135,289
[45] Date of Patent: Aug. 4, 1992

[54] WHEEL COVER ASSEMBLY

[75] Inventors: Jonathan E. Fleck, White Bear Lake, Minn.; Nathanial A. Fleck, Arnegard, N. Dak.

[73] Assignee: Aero de Fleck, Ltd., St. Paul, Minn.

[21] Appl. No.: 573,545

[22] Filed: Aug. 27, 1990

[51] Int. Cl.$^5$ .................................................. B60B 7/04
[52] U.S. Cl. .............................. 301/37 R; 301/37 TP; 301/37 SC
[58] Field of Search ......... 301/108 R, 108 S, 108 SC, 301/37 R, 37 C, 37 CD, 37 TP, 37 PB, 37 S, 37 SC

[56] References Cited

U.S. PATENT DOCUMENTS

| | | | |
|---|---|---|---|
| 2,550,222 | 4/1951 | Carlin | 301/37 SC |
| 2,631,895 | 3/1953 | Hunt | 301/37 PB |
| 2,885,931 | 5/1959 | MacDonald et al. | 301/108 R |
| 2,902,316 | 9/1959 | Black | 301/37 S |
| 2,935,360 | 3/1960 | Lyon | 301/37 SC |
| 4,241,954 | 12/1980 | Brown | 301/37 R X |
| 4,889,394 | 12/1989 | Ruspa | 301/37 PB |

FOREIGN PATENT DOCUMENTS

| | | | |
|---|---|---|---|
| 651049 | 3/1951 | United Kingdom | 301/37 S |
| 1128902 | 10/1968 | United Kingdom | 301/37 TP |

*Primary Examiner*—Russell D. Stormer
*Attorney, Agent, or Firm*—Edna M. O'Connor; Gregory W. O'Connor

[57] ABSTRACT

Road equipment wheels often have accessories mounted on or in the cavity formed by the tire mounting rim and the hub engaging face. Mounting systems for these accessories tend to be complicated and difficult to mount to and remove completely from the wheel. The disclosed mounting assembly includes radially movable arms and hand operated centrally mounted bolt or shaft to bring the arms into gripping engagement with the wheel, preferably on the inwardly facing surface of the rim between the inset face of the wheel and a circumferential boss on the rim or on the radially inwardly facing edges of a series of cutout handholds on the inset face of the wheel. The assembly, together with the accesory, can be mounted and dismounted quickly and easily by operation from outside the wheel.

12 Claims, 3 Drawing Sheets

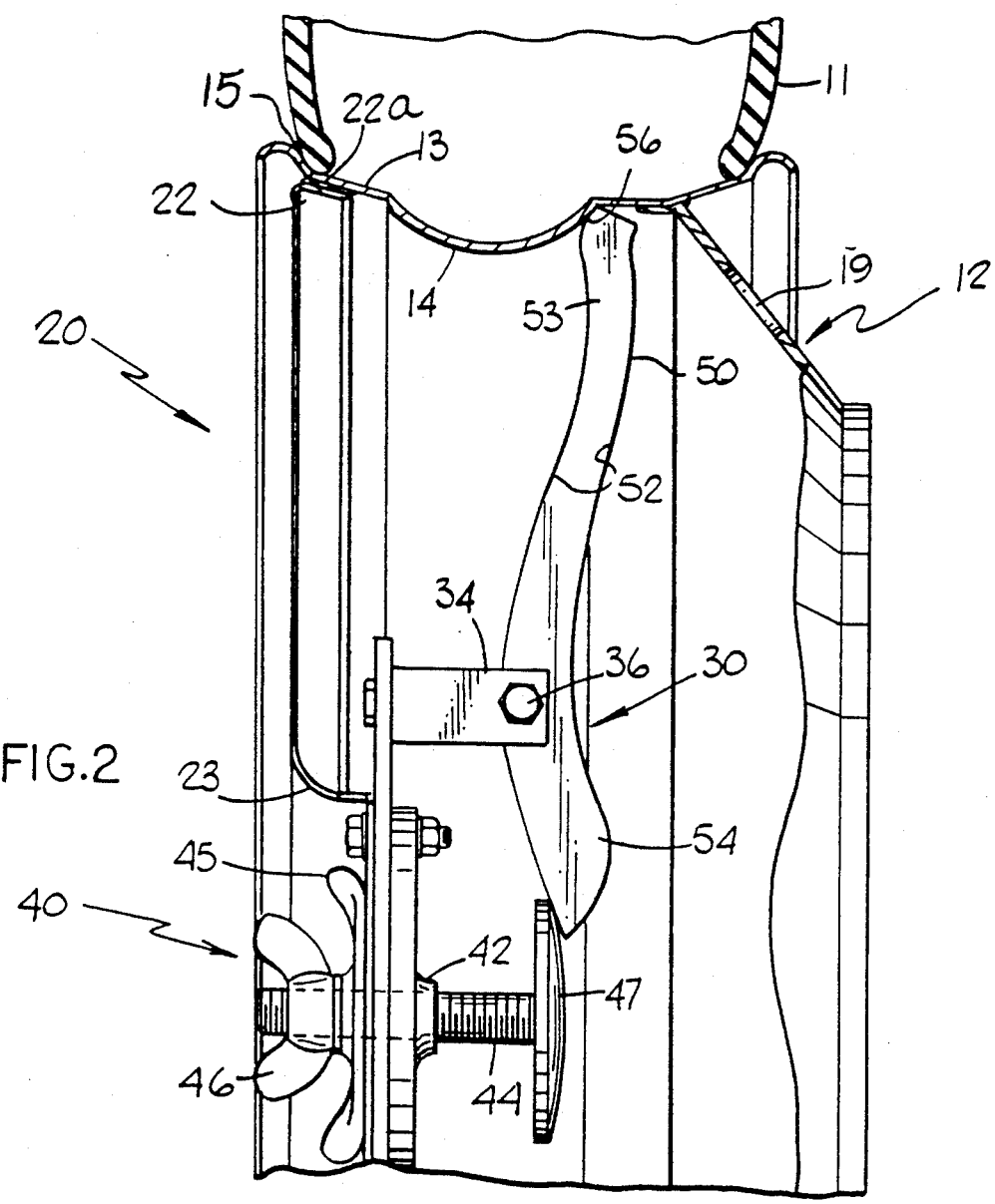
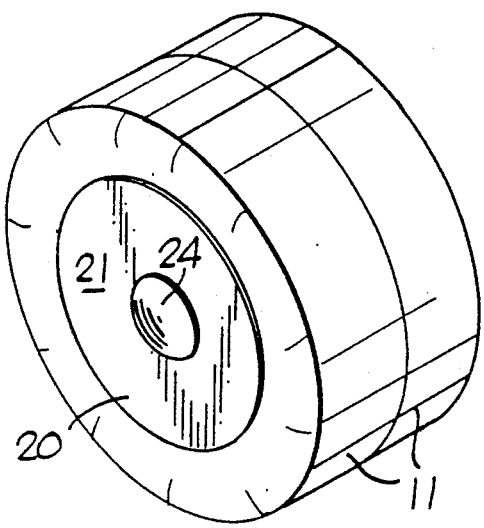

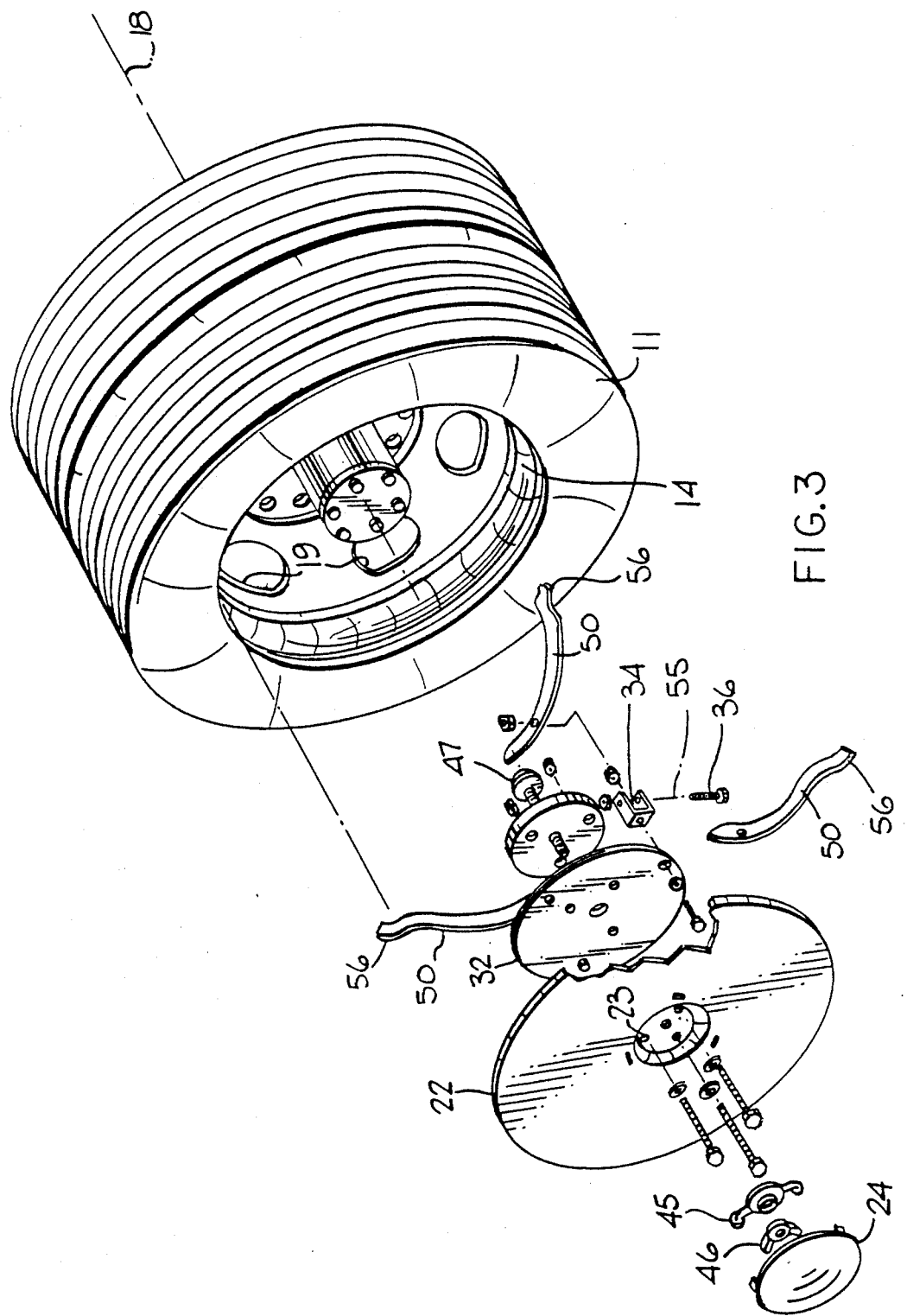

WHEEL COVER ASSEMBLY

BACKGROUND OF THE PRIOR ART

The invention relates to wheel covers and the like fastened to the outer face of vehicle wheels. More particularly, the invention concerns an assembly for attaching wheel covers and other wheel mounted accessories to wheels having deeply inset or dished face portions, such as the outside wheels of dual wheel assemblies on large trucks and/or trailers.

Wheel discs, covers, hubodometers, wheel balancing systems, tire pressure monitoring systems or other wheel mounted accessories fulfill a number of needs in the trucking industry. Currently, considerable interest is being generated in using wheel covers to aid in streamlining large truck rigs. Such streamlining reduces air turbulence and drag, resulting in increased fuel efficiency, and reduces air buffeting noise and rain splashback. However, the number of relatively complex fastening systems used to attach the wheel covers and other accessories has increased.

Most, such as that shown in U. S. Pat. No. 4,761,040, use extensions or attachments for the mounting bolts common to all truck wheel systems which are normally used to fasten the axle shaft plate to the truck hub. Other fastening systems such as those described as prior art in the above patent, employ straps or bars which hook onto the cutout portions in the disc wheel face portion. These bars in turn are bolted to the wheel cover with a bolt plate or the like. In general though, these systems require several different parts or are provided in several different configurations to accommodate the many variations of lug bolt patterns and hand hold cutout configurations.

In another development, a dynamic wheel balancing system uses a metal ring positioned between the inset face of a truck wheel and the circumferential boss on the wheel mounting rim. The diameter of this ring is adjusted by an expandable section in the ring including a rotatable bolt positioned along the circumference of the ring which threadably engages projecting tabs on the ends of the metal ring. This system requires the use of at least one hand tool to mount the expandable ring, and could not be mounted or dismounted from outside the wheel, which limits its use for attaching wheel discs and other accessories which cover or seal the face of the wheel.

OBJECTS OF THE INVENTION

It is an object of this invention to provide a mounting system for wheel covers and the like which is simple and quick to mount and dismount from a truck wheel, and does not require several different parts to accommodate diferent wheel styles such as aluminum disc wheels, steel disc wheels, and cast spoke rims.

It is another object of this invention to afford a wheel cover which includes a mounting assembly which can be quickly and dependably operated without the use of tools to attach and release a wheel accessory such as a wheel cover to a wheel regardless of the particular bolt or hand hold configuration.

It is a further object of this inveniton to provide a wheel cover and mounting assembly which can be operated to firmly affix the wheel cover to a wheel having a radially inwardly extending annular boss on the tire mounting rim of a wheel by operating a single mounting mechanism from the outside of the wheel cover.

SUMMARY OF THE INVENTION

Accordingly, the invention provides for an assembly for mounting a device such as a wheel cover fo the tire mounting rim of a vehicle wheel, the rim having a recessed face attached thereto, and wherein said wheel further includes an inwardly facing circumferential surface defining a critical circumference, the assembly comprising means for gripping said wheel on a side of said critical circumference opposite from said device to be mounted, means operative from an outside surface of the device to be mounted for moving said meand for gripping from a first position radially inward of said critical circumference to a second position radially outward of said critical diameter, whereby siad means for gripping said wheel is brought to gripping engagement with said radially inwardly facing surface and said device is firmly attached to said wheel. Depending on the type of the wheel to which the invention is being attached, this critical diameter may b defined by either a radially inwardly projecting boss formed on the inside of the tire mounting rim portion of the wheel, or it may be defined by the outermost edges of series of handholds or openings in the disc portion of the wheel.

Also disclosed is an assembly for mounting a device such as a wheel cover to the tire mounting rim of a vehicle wheel with the rim having a recessed face attached thereto, and the tire mounting rim includes a radially inwardly projecting annular boss, the assembly comprising means mounted for pivotal movement from a first position radially inward of said annular boss to a second position radially outward of said boss and between said boss and said recessed face, means operative from an outside surface of the device to be mounted for moving said pivotally mounted means from said first position to said second position.

Also disclosed is a wheel cover assembly comprising a wheel cover and a mounting system for mounting the wheel cover to the outward side of a super single wheel or the outer wheel of dual wheel assembly, the wheel including a generally disk shaped face and an annular tire mounting rim radially outward of said face, said rim including an annular boss on an inwardly facing surface of said rim and axially spaced from said face, said wheel cover assembly comprising a wheel cover having an inside surface normally facing the wheel, and outside surface facing outwardly from said wheel, means for engaging the inside surface of said rim between said face and said boss, means for moving said engaging means from a position radially inward of said boss to a position radially outward of said boss, whereby the engaging means is brought to bare against the inside surface of the rim and hold the wheel cover assembly to said wheel.

BRIEF DESCRIPTION OF THE DRAWINGS

FIG. 1 shows a perspsective view of a wheel cover mounted to a dual wheel assembly according to the present invention.

FIG. 2 is a pratial cross sectional view of the assembly taken along line 2—2 of FIG. 1.

FIG. 3 is an exploded view of the wheel accessory mounting assembly of the present invention.

DESCRIPTION OF THE PREFERRED EMBODIMENT

Figure 4:
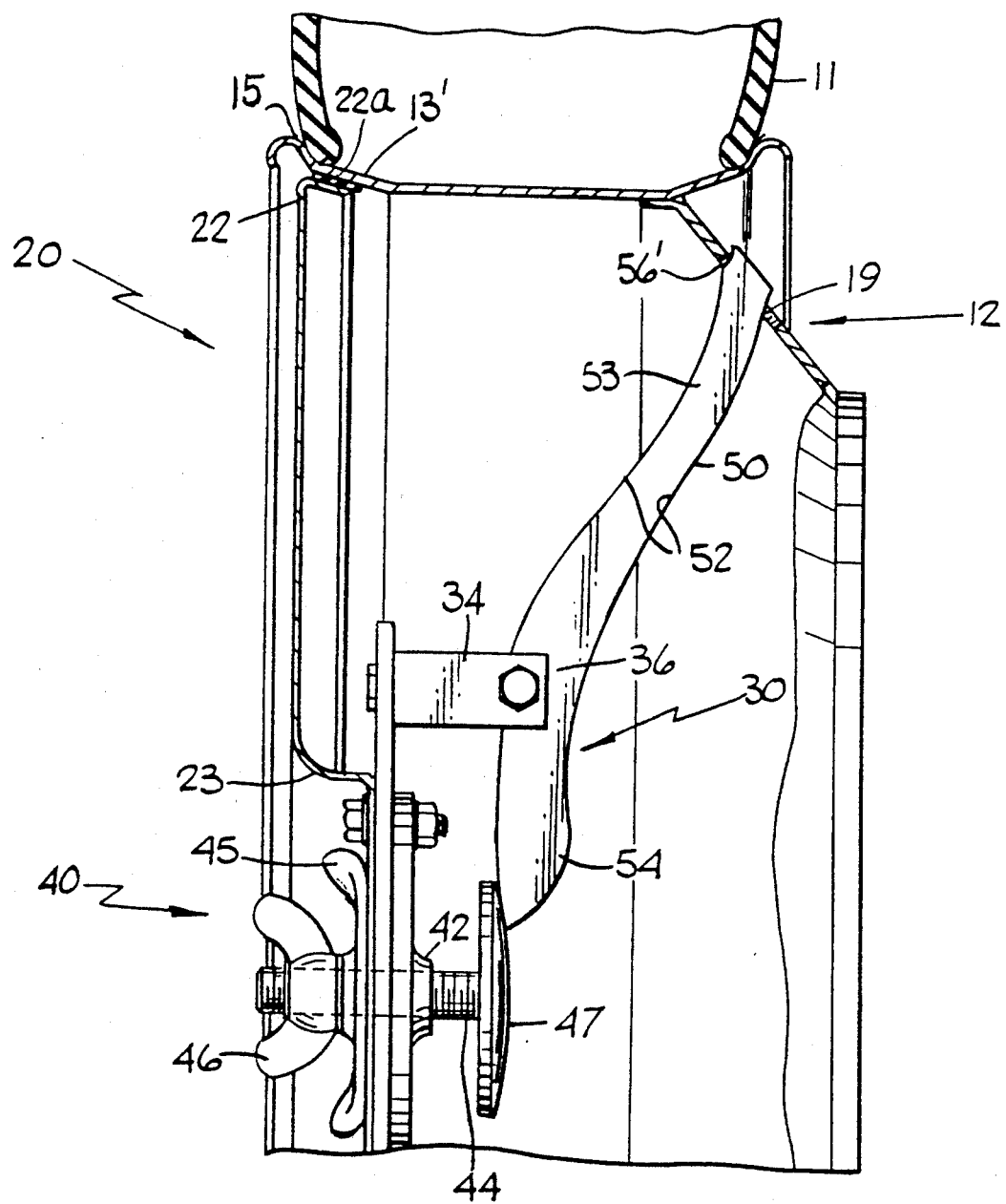
FIG. 4 is an exploded view of an alternate version of the wheel accessory mounting assembly of the present invention.

A dual wheel assembly 10 of known type includes two large tires 11 mounted on a pair of usualy steel wheels which are bolted together to form a unit. This assembly is of course fastened to the axle of a truck or trailer wheels using the bolt holes provided in the face of the wheel in a conventional manner. The outer wheel 12 usually includes a deeply inset or dished outer face, defined by an inset face portion 16 attached at an inner edge of the tire mounting rim 13. This deeply inset or dished outer face is also apparent in the "supers single" wheel configurations which can be substituted for the more conventional dual wheel systems. This deeply inset face portion results in a large, basically cylindrical cavity which can produce considerable turbulence and drag from the impact of the relative wind resulting frm the vectorial sum of the travel speed of the truck and trailer, the wind velocity, (the sum of which forms the apparent wind on the moving vehicle impacting it at the yaw angle) and the rotation of the wheel.

Most conventional wheels (either case spoke or disc) include a circumferential boss 14 which defines a portion of the inward facing surface of the rim. The inset face portion on disc style wheels includes cut outs which form holes known as handholds 19. Both the hand holds and the inward facing surface present opportunities for mounting various wheel accessories using the inventive device as will be detailed. The tire mounting rim 13 includes an outer rim edge 15 which captures the bead of the tire 11, serves to support conventional balancing weights, if any, and as will be seen, aids in centering at least one type of wheel accessory 20 when mounted by the inventive device, such as the disclosed wheel cover 21. As shown in FIGS. 2 and 4, the beads od the mounted tire 11 are normally spaced axially from one another and bracket the boss 14.

The preferred wheel cover 21 is a generally circular disc which is generally flat but includes a slight convex dome shaped outer surface and a correspondingly concave inner surface normally facing the inside of the wheel. An outer disc edge 22 has a frusto-conical tapering surface. This outer disc edge 22 engages the outer rim edge 15 which, in conjunction with a mounting asembly 30, stabilizes, supports and centers the wheel cover 21 as will be explained.

The wheel cover 21 includes a center recess 23 preferably covered by a cap 24 for conveniently mounting and containing the mounting assembly 30. The overall construction as seen in FIG. 1 presents a smooth outer surface with superior aerodynamic characteristics.

The mounting assembly 30 will now be detailed. The mounting assembly 30 comprises two main portions-the wheel engaging means 50 and the externally operative means 40 for selectively bringing the wheel engaging means 50 into engagement with the wheel. The externally operated mens includes a single, axially mounted center shaft 44 which carries an enlarged head 47 on its inner end, with the remainder passing outwrd through the wheel accessory 20 to the outside and preferably terminating in the center recess 23. The threads of the threaded center shaft 44 engage a mounting plate assembly which is affixed to the inner surface of the center recess 23. Thus, when the threaded center shaft 44 is rotated relative to the wheel cover 21, the enlarge head moves axially. Threaded onto the outer end of the threaded center shaft 44 is a winged locking nut 45 and a conventional wing nut 46. When these two threaded nuts are forced by rotation, usually by applying only hand pressure, to lock against one another, they become an effective handle to turn the threaded center shaft 44 and thus operate the mounting asembly. Also, when these two nuts are turned to bear against the mounting plate 32 and lock against each other, they serve to lock the threaded center shaft 44 aginst further movement and thus they operate to prevent the mounting assembly 30 from releasing its engagement from the wheel.

Within the cavity of the wheel and inward of the enlarged head 47 are a series of wheel engaging means in the form of arms 52. These arms are preferably made of a tough, engineering plastic such as fibre reinforced nylon, butmay also be formed of steel or aluminum tube. They are mounted for pivotal movement about axes 55 which are preferably at right angles to the axis 18 of the wheels through the action of pivot axles 36 mounted on a series of simple pivot supports 34. There are preferably at least two and ideally three such wheel engaging means each comprising an arm, a pivot axle, and a pivot support arranged to radiate out from the threaded center shaft 44. Each of the arms 52 includes a first or outer side 53 which terminates at a rim contacting end 56. The ends together define a variable circumference which can be adjusted, depending on the pivotal position of each arm end 56 about the axles 36, to be smaller than the circumference defined by the boss 14 or the hand holds (so that the wheel accessory 20 can be removed from the wheel) to a circumference which is substantially larger than such that critical circumference (so that the wheel accessory 20 is firmly mounted onto the wheel). This adjustment is accomplished by the enlarge head 47 which bears on the inner end of the second or inner side 54 of each of the arms 52.

As the ends 56 bear agains the inner side of the circumferential boss 14 or other structure defining the critical circumference as described above, the mounting assembly and its supported wheel accessory tend to be pulled inwardly towards the wheel assembly. The arrangement shown in the figures; uses this phenomenon to further affix and center wheel cover 21. The wheel cover 21 is sized to bring the outer disc edge to abut the outer rim edge. The frusto-conical shape of the edge 22 tends to assure that the cover is properly centered and generally perpendicular to the axis 18 of the wheel assembly. The shape of the disc edge also assures that slight variations in the effective diameter of the outer rim edge can be accommodated. The effective seal formed by this rim to edge engagement is another benefit of the cooperative relationship between the disc edge 22 and the arms 52. This seal can be enhanced by providing an elastomeric layer 22a which engages the rim 13 when the wheel cover is in place.

The general operation of the preferred embodiment becomes quite apparent from the above description. The winged lock nut 45 and the wing nut 46 are turned to bear against one another and lock onto the outer end of the threaded center shaft 44. The operator then adjusts the center shaft using the wing nuts to assure that the circumference defined by the outer arm ends 56 is less than the critical diameter of, depending on how the accessory is to be mounted and the configuration of the wheel, either a) the wheel as defined by the smallest circumference of the inwardly facing surface of the tire mounting rim (usually the circumferential boss 14) or b) the outermost edges of the hand holds 19. Thus adjusted, the assembly is inserted into the wheel to place the accessory being mounted into approximately its desired position on the wheel. Now the center shaft is rotated by hand via the wing nuts to force the enlarged head against the second sides of the arms to simultaneously expand outwardly all the outer ends 56 of the arms 52 to firmly engage the wheel. Then, the winged nuts are loosened from their mutual engagement so that they can be turned on the center shaft 44 and brought to bear firmly against the mounting plate 32. Again, hand pressure may be used to threadably lock both nuts 45 and 46 against one another and against the center nut 42. Thus, the center shaft, its enlarged head, the arms 52 and the winged nuts are locked into this engaging position. To remove the assembly, these steps are reversed.

When attaching the inventive device to wheels which lack the characteristic circumferencial boss 14 but do have hand holds or the like arranged in a circumference around the inset face (such as that shown in FIG. 4), the inventive device is used substantially as above. The ends of the arms 53 need only be threaded through appropriate handholds 19. This may require rotating the threaded shaft 44 to move the enlarged head further towards the mounting plate 42 so that the arms are arrayed in a relatively small circumference. Then, the shaft is rotated to bring the arms to engage the outermost edges of the engaged cutouts as shown. It may be desirable to provide a hook like shape for the ends 56' to enhance the ability of the arms to engage the handholds 19.

These mounting and dismounting operations can be done with remarkable speed and dependability, especially important when the wheel assembly or the thus mounted wheel accessory must be serviced or inspected under less than ideal conditions e.g. at night, in rain or snow, or when the operator must work close to passing traffic. In tests, a prototype wheel cover and mounting assembly combinaton could be mounted or dismounted in less than 10 seconds under good conditions, with similar speed likely in less than ideal conditions.

The cooperation between the mounting assembly and the engagement between the outer disc edge 22 and the wheel rim results in many benefits also. The substantially continuous circumferential support provided to the wheel cover results in reduced noise from wheel cover vibration and wind. The additional support could permit using thinner wheel cover material—a cost and weight savings.

Also, while the rim engaging ends 56 are shown to be integrally formed with the arms themselves, material or devices enhancing the gripping function could be added to the arms to constitute these ends. For example, hardened steel points or sharp carbide tips could be employed to assure that the mounting assembly, once mounted, would not rotate relative to the wheel. Also, such pointed arms could be used to grip wheels having inwardly facing rim surfaces which comprise an essentially right circular cylindrical surface, and thus may not include a distinctive circumferential boss. In such situations, the essentially right circular cylindrical surface of such rims would itself constitute the critical diameter. The pointed, rim contacting ends penetrate that surface slightly when forced outwardly by the operating means and so define a circumference slightly larger than that critical diameter, and thus fastening the accessory firmly to the wheel.

We claim:

1. An assembly for mounting a device, such as a wheel cover, to the tire mounting rim of a vehicle wheel, said vehicle wheel being the deep dish type comprising a tire mounting rim and a recessed face attached to said tire mounting rim and positioned axially inward of said mounting rim, and wherein said wheel further includes a radially inwardly facing means for defining a critical circumference, said means being located axially inward of the normal location of the outer bead of a tire mounted on said rim, the combination of said device and said assembly comprising means for gripping said wheel on a side of said critical circumference axially remote and opposite from said device to be mounted, means operative from an outside surface of the device to be mounted for moving said means for gripping from a first position radially inward of said critical circumference to a second position radially outward of said critical circumference, wherein said means for gripping comprises at least one arm attached to said device, said arm including a rim contacting end mounted to said device for pivotal movement about an axis which is substantially perpendicular to the axis of the wheel whereby said means for gripping said wheel is brought to gripping engagement with said radially inwardly facing surface and said device is firmly attached to said wheel.

2. An assembly as set forth in claim 1 wherein said arm is mounted on an axle on said perpendicular axis and includes a first arm portion extending from said axle to said rim engaging end, and a second arm portion opposite from said first arm portion, and said means for moving includes means for selectively engaging said second arm portion, whereby said arm can be selectively rotated about said axle by said means for moving.

3. An assembly as set forth in claim 1 wherein said assembly includes at least three of said arms, each mounted on an axle perpendicular to the axis of the wheel, each said arm including an arm portion, and each said portion being selectively engaged by said means for moving.

4. An assembly as set forth in claim 1 wherein said radially inward facing means comprises an annular boss, said boss defining said critical circumference.

5. An assembly for mounting a device such as a wheel cover to the tire mounting rim of a vehicle wheel, the rim having a recessed face attached thereto, and wherein said wheel further includes an inwardly facing means for defining a critical circumference, the assembly comprising means for gripping said wheel on a side of said critical circumference opposite from said device to be mounted, means operative from an outside surface of the device to be mounted for moving said means for gripping from a first position radially inward of said critical circumference to a second position radially outward of said critical circumference, whereby said means for gripping said wheel is brought to gripping engagement with said inwardly facing means and said device is firmly attached to said wheel, wherein said recessed face is an inset disk like face having a plurality of handholds defined therethrough, a radially outermost side edge of selective ones of said handholds defining said critical circumference, 6. A wheel cover assembly comprising a wheel cover and a mounting system for mounting the wheel cover to the outward side of a dual wheel assembly, the wheel assembly including a generally disk shaped inset face and an annular tire mounting rim radially outward of said inset face, said rim including an annular boss located axially between the portions of the rim on which the beads of a tire mounted thereon are normally positioned, said annular boss having an inner side axially confronting said inset face and spaced a substantial distance from said inset face, said wheel cover assembly comprising

- a wheel cover having an inside surface normally facing said inset face, and an outside surface facing outwardly from said inset face,
- means for engaging said rim on the inner side of said boss and spaced from said inset face,
- means for moving said engaging means from a position radially inward of said boss to a position radially outward of said boss, whereby the engaging means is brought to bear against the inside surface of the rim to hold the wheel cover assembly against said wheel.

7. A wheel cover assembly as set forth in claim 6 wherein said means for moving is operable from the outside surface of said wheel disc.

8. A wheel cover assembly as set forth in claim 6 wherein said means for engaging includes a plurality of arms, means for mounting said arms for pivotal movement relative to said wheel cover in response to said means for moving.

9. A wheel cover assembly as set forth in claim 8 wherein said means for moving includes a shaft, an enlarged head on said shaft, said enlarged head positioned to engage and move said plurality of arms simultaneously when said shaft is moved.

10. A wheel cover assembly as set forth in claim 9 wherein said shaft is mounted for relative axial movement parallel to the axis of said wheel, and each said arm is mounted for relative movement perpendicular to said relative axial movement of said shaft.

11. A wheel cover and a mounting system for mounting the wheel cover to the outward side of a dual wheel assembly, the wheel assembly including a generally disk shaped inset face and an annular tire mounting rim radially outward of said face, said rim including an annular boss on an inwardly facing surface of said rim and axially spaced from said face, said wheel cover assembly comprising

- a wheel cover having an inside surface normally facing said face, and outside surface facing outwardly from said face,
- means for engaging the inwardly facing surface of said rim between said face and said boss,
- means for moving said engaging means from a position radially inward of said boss to a position radially outward of said boss, whereby the engaging means is brought to bear against the inwardly facing surface of said rim to hold the wheel cover to said wheel assembly, wherein said means for engaging includes a plurality of arms, means for mounting said arms for pivotal movement relative to said wheel cover in response to said means for moving, wherein said means for moving includes a shaft, an enlarged head on said shaft, said enlarged head positioned to engage and move said plurality of arms simultaneously when said shaft is moved wherein said means for moving includes a first wing nut and a second wing nut, and said shaft includes threads for threadably engaging said wheel cover and said first and second wing nuts, said first and second wing nuts being operable by hand to alternately rotate said shaft to move it axially relative to said wheel cover and to lock said shaft to prevent said relative movement.

12. An assembly for mounting a device such as a wheel cover, to the tire mounting rim of a vehicle wheel, said vehicle wheel being the deep dish type comprising a tire mounting rim and a recessed face attached to said tire mounting rim and positioned axially inward of said mounting rim, and wherein said wheel further includes an radially inwardly facing circumferential surface defining a critical circumference, the combination of said device and assembly comprising

- means for gripping said wheel on a axially remote side of said critical circumference opposite from said device to be mounted,
- means operative from an outside surface of the device to be mounted for moving said means for gripping from a first position radially inward of said critical circumference to a second position radially outward of said critical diameter, whereby said means for gripping said wheel is brought to gripping engagement with said radially inwardly facing surface and said device is firmly attached to said wheel wherein said means for gripping comprises at least one arm attched to said device, said arm is mounted to said device for pivotal movement about an axis which si substantially perpendicular to the axis of the wheel.

* * * * *